(12) United States Patent
Cheng et al.

(10) Patent No.: US 9,331,878 B2
(45) Date of Patent: May 3, 2016

(54) FREQUENCY SHIFT KEYING TRANSMITTER

(75) Inventors: San Jeow Cheng, Singapore (SG); Yuan Gao, Singapore (SG); Yuanjin Zheng, Singapore (SG); Chun Huat Heng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 101 days.

(21) Appl. No.: 14/125,456

(22) PCT Filed: Jun. 14, 2012

(86) PCT No.: PCT/SG2012/000212
§ 371 (c)(1),
(2), (4) Date: Aug. 25, 2014

(87) PCT Pub. No.: WO2012/173573
PCT Pub. Date: Dec. 20, 2012

(65) Prior Publication Data
US 2014/0362952 A1    Dec. 11, 2014

(30) Foreign Application Priority Data

Jun. 14, 2011    (SG) .................................. 201104306

(51) Int. Cl.
*H04B 7/02*     (2006.01)
*H04L 1/02*     (2006.01)
(Continued)

(52) U.S. Cl.
CPC .............. *H04L 27/12* (2013.01); *H04L 27/156* (2013.01)

(58) Field of Classification Search
CPC .................................................... H03L 7/0812
See application file for complete search history.

(56) References Cited

U.S. PATENT DOCUMENTS

| 6,418,174 B1 | 7/2002 | Benedict | |
| 7,126,511 B2 * | 10/2006 | Draxelmayr | H03M 1/0624 341/118 |
| 7,317,775 B1 * | 1/2008 | Erhart | H03L 7/0807 327/151 |

(Continued)

OTHER PUBLICATIONS

Razavi, A Study of Injection Locking and Pulling in Oscillators, 39 IEEE Journal of Solid-State Circuits 1415 (IEEE 2004).

(Continued)

*Primary Examiner* — Sam K Ahn
*Assistant Examiner* — Fabricio R Murillo Garcia
(74) *Attorney, Agent, or Firm* — K. David Crockett, Esq.; Niky Economy Syrengelas, Esq.; Crockett & Crockett, PC

(57) ABSTRACT

According to embodiments of the present invention, a frequency shift keying transmitter is provided. The frequency shift keying transmitter includes a logic gate arrangement that produces an output signal having a frequency that depends on input signals to the logic gate arrangement, a clock generator coupled to the logic gate arrangement, the clock generator adapted to produce a clock signal, and a sampling arrangement coupled to the logic gate arrangement, the sampling arrangement adapted to receive a data signal, wherein the sampling arrangement is configured to sample the clock signal to generate periodic waveforms delayed from each other by an interval determined by the point the clock signal is sampled, wherein the sampling arrangement is configured to be controlled by the data signal to have the logic gate arrangement select periodic waveforms that are delayed from each other by one of a set of intervals associated with the data signal, to be used as the input signals to the logic gate arrangement to produce the output signal.

18 Claims, 6 Drawing Sheets

(51) Int. Cl.
*H04L 27/12* (2006.01)
*H04L 27/156* (2006.01)

(56) References Cited

U.S. PATENT DOCUMENTS

| | | | | |
|---|---|---|---|---|
| 7,436,229 | B2* | 10/2008 | Sidiropoulos | H03L 7/081 327/147 |
| 2004/0001560 | A1 | 1/2004 | Darabi | |
| 2006/0256910 | A1* | 11/2006 | Tal et al. | 375/376 |
| 2008/0075222 | A1* | 3/2008 | Lee et al. | 375/376 |

OTHER PUBLICATIONS

Bohorquez, et al., A 350 µW CMOS MSK Transmitter and 400 µW OOK Super-Regenerative Receiver for Medical Implant Communications, 44 IEEE Journal of Solid-State Circuits 1248 (IEEE 2009).
Perrott, et al., A 27-mW CMOS Fractional-N Synthesizer Using Digital Compensation for 2.5-Mb/s GFSK Modulation, 32 IEEE Journal of Solid-State Circuits 2048 (IEEE 1997).
Bae, et al., A 490µW Fully MICS Compatible FSK Transeiver for Implantable Devices, Symposium on VLSI Circuits Digest of Technical Papers 36 (2009).
Pandey, et al., A 90 µW MICS/ISM Band Transmitter with 22% Global Efficiency, IEEE Radio Frequency Integrated Circuits Symposium 285 (IEEE 2010).
Liu, et al., A Wideband PLL-Based G/FSK Transmitter in 0.18 µm CMOS, 44 IEEE Journal of Solid-State Circuits 2452 (IEEE 2009).
Paciorek, Injection Locking of Oscillators, 53 Proceedings of the IEEE 1723 (1965).
Kim, et al., PLL/DLL System Noise Analysis for Low Jitter Clock Synthesizer Design, 4 IEEE Proc. of Int. Symp. on Circuits and Systems 31 (IEEE 1994).
Cheng, et al., A 2GHz Fully Differential DLL-Based Frequency Multiplier for High Speed Serial Link Circuit, IEEE Proc. of Int. Symp. on Circuits and Systems 1174 (IEEE 2005).
Bazes, et al., An Interpolating Clock Synthesizer, 31 IEEE Journal of Solid-State Circuits 1295 (IEEE 1996).
Heng, et al., A 1.8-GHz CMOS Fractional-N Frequency Synthesizer with Randomized Multiphase VCO, 38 IEEE Journal of Solid-State Circuits 848 (IEEE 2003).
Wentzloff, et al., A 47pJ/Pulse 3.1-to-5GHz All-Digital UWB Transmitter in 90nm CMOS, IEEE International Solid-State Circuits Conference 118 (IEEE 2007).
Bradley, An Ultra Low Power, High Performance Medical Implant Communication System (MICS) Transeiver for Implantable Devices, IEEE Proc. of Biomedical Circuits and Systems 158 (IEEE 2006).
Cho, et al., A 10.8 Body Channel Communication/MICS Dual-Band Transceiver for a Unified Body Sensor Network Controller, 44 IEEE Journal of Solid-State Circuits 3459 (IEEE 2009).
Zarlink Semiconductor, Medical Implantable Rf Transeiver, Zaralink ZL70101 1 (2007).
Adler, A Study of Locking Phenomena in Oscillators, Proceedings of the I.R.E. and Waves and Electrons 351 (1946).
Boom, et al., A 5.0mW 0dBm FSK Transmitter for 315/433 MHz ISM Applications in 0.25µm CMOS, Proceeding of the 30th European Solid-State Circuits Conference 199 (2004).

* cited by examiner

FREQUENCY SHIFT KEYING TRANSMITTER

CROSS-REFERENCE TO RELATED APPLICATION

This application claims the benefit of priority of Singapore patent application No. 201104306-4, filed 14 Jun. 2011, the content of it being hereby incorporated by reference in its entirety for all purposes.

TECHNICAL FIELD

Various embodiments relate to a frequency shift keying transmitter.

BACKGROUND

Narrowband applications like telemetry in the Medical Implant Communication Service (MICS) band require a power efficient, relatively high data rate transmitter for short range communication. Low-power transceivers capable of delivering reasonably high communication data rate 1 Mbps are often required for short range communication of 1 m to 5 m. In battery-less remote control applications, where energy is harvested from a push button piezoelectric or other mechanical means, more stringent requirements on power consumption is imposed. While frequency shift keying (FSK), where binary bits are represented by 2 different frequencies, is often adopted as the signaling scheme for short range communication for its robustness and ease in performing modulation and demodulation operations, power efficiency still poses a great challenge in the transmitter design, especially for the above-mentioned applications.

A frequency shift keying (FSK) transmitter is often based on the fractional-N PLL (phase-locked loop) [M. Perrott, T et al., "A 27-mW CMOS fractional-N synthesizer using digital compensation for 2.5-Mb/s GFSK modulation," IEEE J. Solid-State Circuits, vol. 32, pp. 2048-2060, December 1997]. This architecture consumes few to tens of mW as it involves dividing down from a high frequency domain that is often tens of times of the desired frequency to minimize quantization noise for good phase noise performance. The architecture includes a power hungry modulus divider circuit which often consists of flip-flops and logic counters to obtain the required division ratio. The transmitter is energy-inefficient due to complexity and higher operation frequency. The PLL is not inherently stable, so design effort to ensure loop stability has to be enforced. However, high data-rate is often achievable with these designs. The control word, K, determines the fractional division ratio between N and N+1, so that the output frequency of the VCO will be a N+fraction multiple of the reference frequency.

Another FSK architecture is the open-loop voltage or digitally controlled oscillator (VCO/DCO) based transmitter having only a voltage or digitally controlled oscillator (VCO/DCO) directly driving the inductive antenna [J. L. Bohorquez, et al., "A 350 µW CMOS MSK transmitter and 400 µW OOK super-regenerative receiver for medical implant communications," IEEE J. of Solid-State Circuits, vol. 44, no. 4, pp. 1248-1259, April 2009; J. Bae, et al., "A 490 µW fully MICS compatible FSK transceiver for implantable devices," IEEE Proc. of Symp. on VLSI Circuits, pp. 36-37, June 2009]. This involves changing the free-running frequency of the oscillator through some passive element like a varactor or capacitor bank. While this method seems attractive since the design consists of only a single oscillator block, the output signal suffers from frequency drift or instability which is a major drawback. Performance burden is hence shifted to the receiver side. The transmitter also has poor phase noise.

A further FSK transmitter has an injection locked ring oscillator (RO) with hybrid edge combiner/power amplifier (EC/PA) architecture [J. Pandey and B. Otis, "A 90 µW MICS/ISM band transmitter with 22%global efficiency," IEEE Proc. of Radio Frequency Integrated Circuits (RFIC) Symp., May 2010, pp. 285-288]. The transmitter uses crystal frequency pulling for frequency modulation and employs injection locking twice, serially to 2 ring oscillators (RO) to stabilize the generated signal. The signal is then multiplied up 9 times to its desired frequency via an edge combiner (EC) before transmission through a power amplifier (PA) driven antenna. Through the use of a hybrid EC/PA circuit and keeping the operation of its frequency generating circuit 9 times below the desired frequency, the power consumption is in the sub-100 µW range. However, the system is very rigid as the frequency generating circuit only produces 2 fixed frequencies depending on the physical properties of the crystal, making frequency selection very limited, which inhibits frequency hopping. The frequency range crystal pulling can achieve is typically in the range of 10 s to 100 s of kHz. In order to obtain a wide tuning range, a high factor frequency multiplier is required. A data rate of 200 kbps for the transmitter is reported.

Another FSK transmitter is the delta-sigma modulator ($\Delta\Sigma M$) phase interpolator based transmitter, providing phase interpolation [Y.-H. Liu and T.-H. Lin, "A wideband PLL-based G/FSK transmitter in 0.18 µm CMOS," IEEE J. of Solid-State Circuits, vol. 44, no. 9, pp. 2452-2462, September 2009]. An integer-N PLL generates 4 equally spaced clock edges and through a $\Delta\Sigma M$ controlled phase rotator (PR), it is able to generate fractional delays by performing a dithered selection among the 4 clock phases. Although it can cover a wide frequency range due to $\pi/2$ separation of each clock phase, it suffers from larger quantization noise, resulting in higher in-band noise. Moreover, it is not fully efficient as a divide-by-two block is used to generate the different clock phases, implying that the VCO has to operate at twice the desired frequency rather than directly at the operating frequency. The transmitter is energy-inefficient due to complexity and higher operation frequency. The in-band noise can be reduced if the quantization step is made smaller than $\pi/2$. However, this will result in a more sophisticated design to generate smaller and equal phase separated clock edges.

SUMMARY

According to an embodiment, a frequency shift keying transmitter is provided. The frequency shift keying transmitter may include a logic gate arrangement that produces an output signal having a frequency that depends on input signals to the logic gate arrangement, a clock generator coupled to the logic gate arrangement, the clock generator adapted to produce a clock signal, and a sampling arrangement coupled to the logic gate arrangement, the sampling arrangement adapted to receive a data signal, wherein the sampling arrangement is configured to sample the clock signal to generate periodic waveforms delayed from each other by an interval determined by the point the clock signal is sampled, wherein the sampling arrangement is configured to be controlled by the data signal to have the logic gate arrangement select periodic waveforms that are delayed from each other by one of a set of intervals associated with the data signal, to be used as the input signals to the logic gate arrangement to produce the output signal.

According to an embodiment, a frequency shift keying receiver adapted to receive and extract the data signal from a phase shift keying transmitter as described herein is provided.

According to an embodiment, a frequency shift keying transmitter is provided. The frequency shift keying transmitter may include a logic gate arrangement that produces an output signal having a frequency that depends on input signals to the logic gate arrangement, a clock generator coupled to the logic gate arrangement, the clock generator adapted to produce a clock signal, and a sampling arrangement coupled to the logic gate arrangement, the sampling arrangement adapted to receive a data signal, wherein the sampling arrangement is configured to sample the clock signal to generate periodic waveforms delayed from each other by an interval determined by the point the clock signal is sampled, wherein the sampling arrangement is configured to be controlled by the data signal to have the logic gate arrangement select two of the periodic waveforms that are delayed from each other by a predefined interval associated with the data signal, to be used as the input signals to the logic gate arrangement to produce the output signal.

According to an embodiment, a frequency shift keying transmitter is provided. The frequency shift keying transmitter may include a logic gate arrangement that produces an output signal having a frequency that depends on input signals to the logic gate arrangement, a clock generator coupled to the logic gate arrangement, the clock generator adapted to produce a clock signal, and a sampling arrangement coupled to the logic gate arrangement and the clock generator, the sampling arrangement adapted to receive a data signal, wherein the sampling arrangement is configured to sample different intervals within the clock signal to cause the clock generator to generate periodic waveforms, which are offset from one another, wherein the data signal controls the sampling arrangement to select which two of the periodic waveforms, offset from each other by a predefined interval, are to be used as the input signals to the logic gate arrangement to produce the output signal, so that the frequency of the output signal depends on the data signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
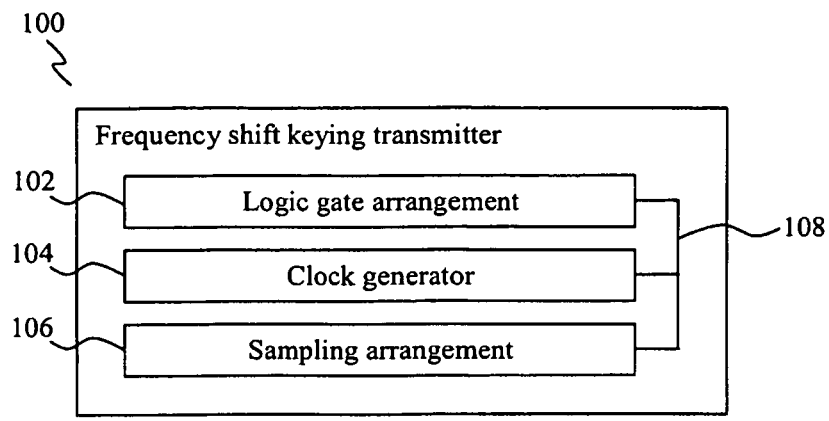
FIG. 1 shows a schematic block diagram of a frequency shift keying transmitter, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the devices are analogously valid for the other device.

In the context of various embodiments, the term "about" or "approximately" as applied to a numeric value encompasses the exact value and a variance of +/−5% of the value.

As used herein, the term "and/or" includes any and all combinations of one or more of the associated listed items.

Various embodiments relate to circuit implementations of a low-power, multi-channel, frequency shift keying (FSK) transmitter for narrowband applications such as Medradio, medical implant communication service (MICS), and/or industrial, scientific and medical (ISM).

Various embodiments may provide a frequency shift keying (FSK) transmitter architecture implemented using a digital delta-sigma ($\Delta\Sigma$) modulator based frequency interpolator for frequency tunability. The architecture may incorporate sub-harmonic injection locking, thereby allowing operation of the clock generation circuit in low frequency, thus saving power without compromising the performance of the transmitter.

Various embodiments may provide a frequency shift keying (FSK) transmitter, for example a multi-channel delta-sigma ($\Delta\Sigma$) FSK radio frequency (RF) transmitter, for example with a resultant transmitted signal having a frequency range of about 400 MHz to about 436.4 MHz, e.g. for narrowband applications. Various embodiments may provide an energy efficient FSK transmitter, e.g. a sub-mW FSK RF transmitter.

Various embodiments may provide a highly reconfigurable multi-channel, ultra-low-power frequency-shift keying (FSK) transmitter for narrowband applications such as battery-less remote control applications, designed using the 0.18-μm CMOS technology with a 1.2 V power supply. The power requirements may be stringent due to limited harvested energy. The transmitter of various embodiments may incorporate a 21-bit input delta-sigma modulator ($\Delta\Sigma$M) which controls the frequency modulation. The transmitter may generate a clock pulse with an average frequency between about 133.33 MHz and about 145.5 MHz from a multi-phase delay line using a frequency or period interpolation technique. The pulse is then sub-harmonically injected into an LC oscillator, which drives an antenna for direct transmission. The resultant transmitted signal may have a frequency range of about 400 MHz to about 436.4 MHz, which encompasses the medical implant communication service (MICS) frequency band and the industrial, scientific and medical (ISM) frequency band, paving the way for various usages for the transmitter. The sub-harmonic injection enables the frequency generation circuit to operate in the low-frequency domain, and through the use of high-quality-factor (high-Q) external inductive antenna for the injection-locked LC oscillator, the total power consumption may be reduced to about 3 mW or less at a data rate of about 1 Mbps. The delta-sigma modulator (ΔΣM) also provides flexibility in frequency channel selection, with a resolution of about 16 Hz and frequency tunability of at least 100 kHz.

The FSK transmitter of various embodiments may incorporate a ΔΣ modulator with delay-locked loop (DLL) edge generation, a frequency interpolator for frequency or period interpolation, and injection locking with average frequency.

The FSK transmitter of various embodiments is designed to have relatively good performance in terms of high data rate and frequency flexibility while sustaining power efficiency. Various embodiments may provide a low-power, narrowband solution, with frequency selection.

The FSK transmitter of various embodiments may offer low-complexity, cost effectiveness, low power and high efficiency.

The FSK transmitter of various embodiments may be used for low power, multi-channel, narrowband applications (eg. Medradio, battery-less remote, control), for wireless communication systems, for example in low-power bio-medical applications, and for portable wireless and/or wearable devices.

FIG. 1 shows a schematic block diagram of a frequency shift keying transmitter 100, according to various embodiments. The frequency shift keying transmitter 100 includes a logic gate arrangement 102 that produces an output signal having a frequency that depends on input signals to the logic gate arrangement 102, a clock generator 104 coupled to the logic gate arrangement 102, the clock generator 104 adapted to produce a clock signal, and a sampling arrangement 106 coupled to the logic gate arrangement 102. In FIG. 1, the line represented as 108 is illustrated to show the relationship between the different components, which may include electrical coupling and/or mechanical coupling.

In one embodiment, the sampling arrangement 106 is adapted to receive a data signal, wherein the sampling arrangement 106 is configured to sample the clock signal to generate periodic waveforms delayed from each other by an interval determined by the point the clock signal is sampled, wherein the sampling arrangement 106 is configured to be controlled by the data signal to have the logic gate arrangement 102 select periodic waveforms that are delayed from each other by one of a set of intervals associated with the data signal, to be used as the input signals to the logic gate arrangement 102 to produce the output signal.

In the context of various embodiments, the logic gate arrangement may include one or more logic gates. The logic gate arrangement may further include other elements, e.g. adders or mixers.

In various embodiments, the clock signal includes equally spaced apart clock edges. Each of the clock edges may have a frequency of around 1600 MHz.

In various embodiments, each of the periodic waveforms may have a period equal to 12 of the clock edges. Each periodic waveform may have a leading edge corresponding to each clock edge of the clock signal, and that 12 periodic waveforms may be generated.

In various embodiments, the logic gate arrangement 102 may randomly select the periodic waveforms.

In various embodiments, the interval between periodic waveforms that are successively selected may be any one of an interval of 10, 11, 12 or 13 of the clock edges.

In various embodiments, the output signal may have an average frequency (or period) of the selected periodic waveforms.

In various embodiments, the delay between two successively generated periodic waveforms may be 1/12th of the period of the periodic waveforms. For example, the respective leading edges of the two successive periodic waveforms may differ from each other by a duration of 1/12th of the period of the periodic waveforms.

In various embodiments, the logic gate arrangement 102 may include logic gates having a programmable interconnection, the programmable interconnection configured to connect the logic gates that are used to process two selected periodic waveforms to produce the output signal.

In various embodiments, the data signal includes at least two different words, each word representative of binary data to be transmitted.

In various embodiments, the clock generator 104 may include clock edge combiner circuitry. The clock generator 104 may include delay circuitry coupled to the clock edge combiner circuitry.

In various embodiments, the frequency shift keying transmitter 100 further includes a transmission stage coupled to the logic gate arrangement 102 to receive the output signal from the logic gate arrangement 102 for transmission. The transmission stage may include an oscillator to receive the output signal from the logic gate arrangement 102, and an inductive antenna coupled to the oscillator, wherein the inductive antenna transmits the output signal. The oscillator may include circuitry that is configured to generate a transmission signal based on the third harmonic of the output signal from the logic gate arrangement 102.

In another embodiment, the sampling arrangement 106 is adapted to receive a data signal, wherein the sampling arrangement 106 is configured to sample the clock signal to generate periodic waveforms delayed from each other by an interval determined by the point the clock signal is sampled, wherein the sampling arrangement 106 is configured to be controlled by the data signal to have the logic gate arrangement 102 select two of the periodic waveforms that are delayed from each other by a predefined interval associated with the data signal, to be used as the input signals to the logic gate arrangement 102 to produce the output signal.

In a further embodiment, the sampling arrangement 106 is coupled to the logic gate arrangement 102 and the clock generator 104, the sampling arrangement 106 adapted to receive a data signal, wherein the sampling arrangement 106 is configured to sample different intervals within the clock signal to cause the clock generator 104 to generate periodic waveforms, which are offset from one another, wherein the data signal controls the sampling arrangement 106 to select which two of the periodic waveforms, offset from each other by a predefined interval, are to be used as the input signals to the logic gate arrangement 102 to produce the output signal, so that the frequency of the output signal depends on the data signal.

Various embodiments may provide a frequency shift keying receiver adapted to receive and extract the data signal from the frequency shift keying transmitter 100.

Figure 2:
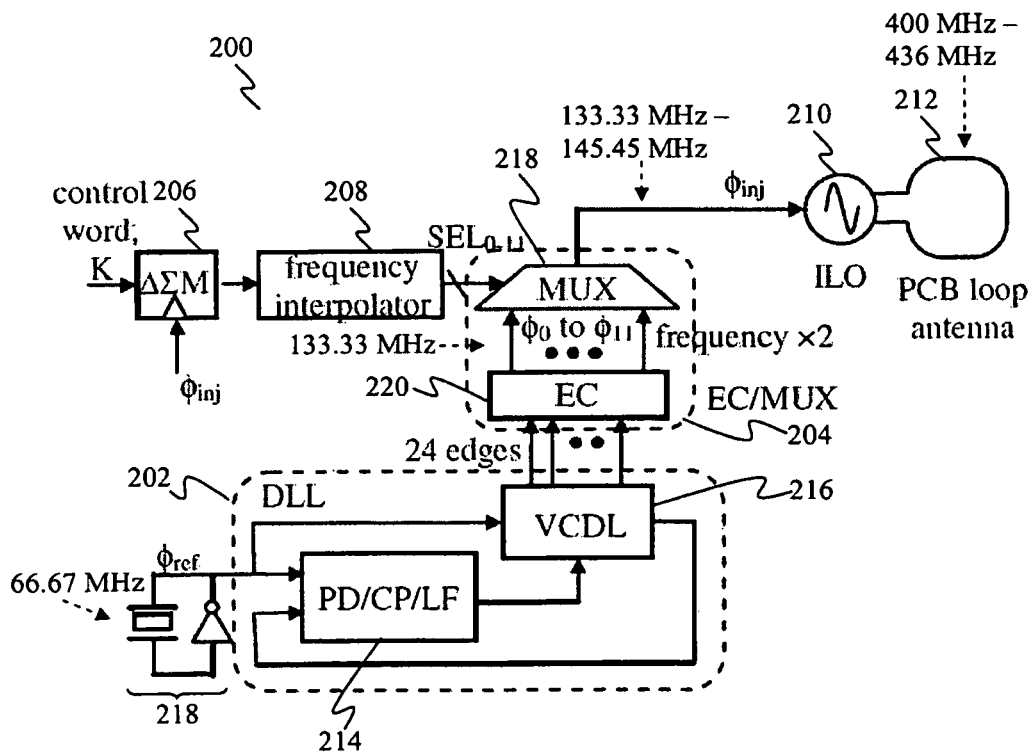
FIG. 2 shows a schematic of a frequency shift keying transmitter, according to various embodiments.

FIG. 2 shows a schematic of a frequency shift keying (FSK) transmitter (e.g. a delta-sigma (ΔΣ) based FSK transmitter) 200, according to various embodiments. The FSK transmitter 200 includes a delay-locked loop (DLL) 202, an edge combiner/multiplexer hybrid block (EC/MUX) 204, a delta-sigma modulator (ΔΣM) 206, a frequency interpolator 208, which may be controlled by the ΔΣM 206, and an injection lock oscillator (ILO) (e.g. an LC oscillator) 210 directly driving an inductive antenna (e.g. a printed circuit board (PCB) loop antenna) 212.

In various embodiments, a buffer may be provided or coupled between the ILO 210 and the antenna 212. The buffer, for example, may be used to store and/or enhance the signal from the ILO 210 prior to transmission to the antenna 212. In a specific example, the buffer may be or may be realized by a power amplifier (PA).

The DLL 202 may include a phase detector (PD), a charge pump (CP) and a loop filter (LF), as represented by the PD/CP/LF block 214, and a voltage controlled delay line (VCDL) (or delay circuitry) 216. Each of the PD/CP/LF block 214, and the VCDL 216 may receive a reference clock, $\phi_{ref}$, from a crystal oscillator 218, as an input. An output signal from the PD/CP/LF block 214 is also inputted to the VCDL 216, and the output of the VCDL 216 is fed back as an input to the PD/CP/LF block 214.

The phase detector (PD), the charge pump (CP) and the loop filter (LF) (i.e. the PD/CP/LF block 214) combine functionally to form a feedback control loop such that the eventual loop filter voltage of the loop filter (LF) may settle or stabilise and may result in the total delay of the VCDL 216 to be at least substantially equal to or close to or approaching to one clock period of the reference clock, $\phi_{ref}$, of the crystal oscillator 218.

The ΔΣM 206 may form part of a sampling arrangement. The ΔΣM 206 includes a quantizer to receive, for example, a sequence of bits. The frequency interpolator 208 may form part of a logic gate arrangement. The ΔΣM 206 receives an input waveform, and a data signal or control word (or control input), K. The frequency interpolator 208 may receive the output of the ΔΣM 206 as an input signal and may, for example, output a select signal, $SEL_{0-11}$, for selecting a clock phase. The ΔΣM 206 controls the frequency interpolator (or edge selector) 208 for selecting a clock phase or signal.

The edge combiner/multiplexer hybrid block (EC/MUX) 204 may include a multiplexer (MUX) 218 and an edge combiner (or a clock edge combiner circuitry) (EC) 220.

The DLL 202 and the EC 220 may form part of a clock generator and may be utilized as a multi-phase reference generator. The DLL 202 may, for example, include a plurality of delay cells to generate a plurality of clock phases of the reference clock, $\phi_{ref}$, where the plurality of clock phases may be different relative each other by their respective phases.

The ILO 210 and the antenna 212 may form part of a transmission stage. The ILO 210 may be used for injection locking onto the frequency interpolated signal generated via clock period averaging. The ILO 210 also receives the waveform $\phi_{inj}$.

In various embodiments, the FSK transmitter 200 may be digital logic intensive, making it amenable to future digital CMOS process scaling.

The operation of the FSK transmitter 200 will now be described.

In the initial startup of the FSK transmitter 200, the total delay in the VCDL 216 of the DLL 202 locks to exactly 1 (one) clock period (e.g. 66.67 MHz) of the reference clock, $\phi_{ref}$, of the crystal oscillator 218. Once locked, the DLL 202 produces or generates 24 evenly or similarly spaced clock phases, each having a reference frequency, $f_{ref}$, of about 66.67 MHz. The 24 clock phases may then be combined using the EC 220 to form 12 equally spaced or separated clock phases or periodic waveforms ($\phi_0$-$\phi_{11}$), effectively doubling the reference frequency to about 133.33 MHz (e.g. $F_{clk}$=133.33 MHz). The 12 clock phases ($\phi_0$-$\phi_{11}$) may be provided to the MUX 218.

The delta-sigma modulator (ΔΣM) controlled frequency interpolator 208 selects one clock phase during each sampling cycle to provide a period related to the output of the ΔΣM 206. After a certain number of sampling cycles, the dithering phase selection sequence generated by the ΔΣM 206 produces an output waveform, $\phi_{inj}$, with an average clock period that is a fraction between $11/12T_{clk}$ and $T_{clk}$, where $T_{clk}$=1/133.33 MHz. On average, the dithering phase selection sequence produces an output waveform, $\phi_{inj}$, with an average clock period that is related to the input or control input, K, of the ΔΣM 206, where the average clock period may be between $11/12T_{clk}$ and $T_{clk}$, where $T_{clk}$=1/(2×$f_{ref}$).

As the ΔΣM 206 produces an average output that matches its input, $\phi_{inj}$, each different control word, K, results in the output having a unique fractional clock period or frequency. Therefore, $\phi_{inj}$ may have a frequency of between about 133.33 MHz and about 145.45 MHz. $\phi_{inj}$ may then be injection locked into the ILO 210 via its third harmonic, thereby causing the free running ILO 210 to lock to 3 times the frequency of $\phi_{inj}$, generating an oscillator output waveform (e.g. a transmission signal) having frequencies ranging from about 400 MHz to about 436.4 MHz. The ILO 210 then drives the antenna 212 directly to achieve FSK modulation. As the ILO 210 drives the antenna 212 directly, an output waveform with tunable frequency may be transmitted.

In various embodiments, $\phi_{inj}$ is used for injection locking for the ILO 210 as well as being a clock to drive the ΔΣM 206. In other words, the same signal $\phi_{inj}$ is used for the ΔΣM 206 and the ILO 210.

In various embodiments, the combination of DLL 202 and the EC 220 doubles the input reference frequency and provides 12 evenly spaced clock phases. The ΔΣM controlled frequency interpolator 208 may be used to interpolate between two clock periods. Through averaging, frequencies ranging from 133.33 MHz to 144.33 MHz may be generated with very fine resolution. Sub-harmonic (3rd) injection-locking of the average output frequency triples the frequency at the output. The frequency may be tuned by changing the digital control word, K. Thus, narrowband tuning may be achieved.

Figure 3A:
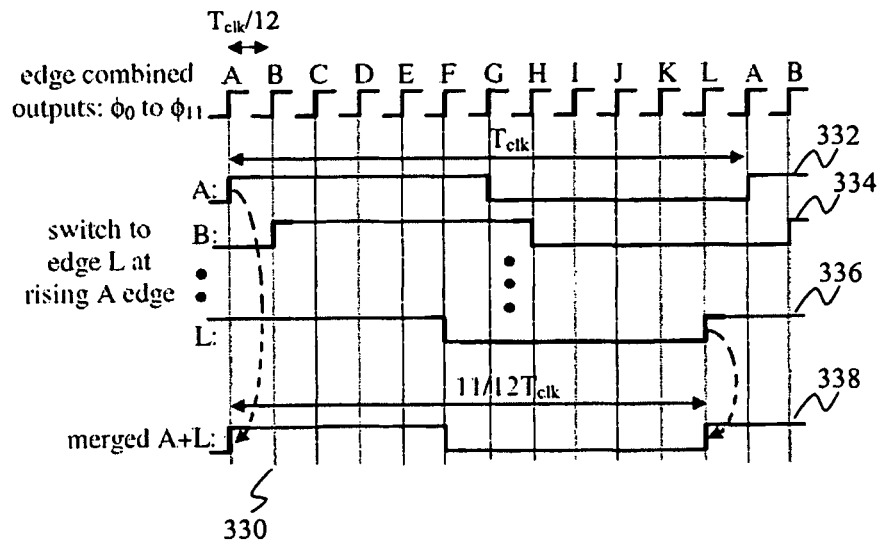
FIGS. 3A and 3B show the operations of a frequency interpolator, according to various embodiments.

FIG. 3A shows an operation of a frequency interpolator (e.g. 208, FIG. 2), according to various embodiments, which enables quantification of the frequency control. At every sampling cycle of the ΔΣM (e.g. 206), a clock phase is selected from the clock phases generated by the EC (e.g. 220). Depending on the next clock phase the frequency interpolator (e.g. 208, FIG. 2) selects in the next cycle, the period of the overall waveform has a certain clock period.

In various embodiments, the difference between the current clock phase and the previous clock phase may determine the current clock period. As shown in FIG. 3A, the clock signal may include equally spaced apart clock edges, as represented by the dotted lines (e.g. 330 illustrated for one clock edge), such that the clock phase or periodic waveform (e.g. 332, 334, 336 illustrated for the waveforms A, B and L respectively) may have a leading edge (⌈) and a falling edge (⌉) that correspond to a clock edge 330. As shown in FIG. 3A, the clock signal may have 12 equally spaced apart clock edges 330. As shown in FIG. 3A, there may be 12 evenly spaced clock phases corresponding to the waveforms A 332, B 334, C, D, E, F, G, H, I, J, K and L 336 (waveforms C to K not illustrated in FIG. 3A), which may correspond to the clock phases $\phi_0$-$\phi_{11}$ of FIG. 2.

Each clock phase $\phi_{i+1}$ (e.g. periodic waveform B 334) leads a clock phase $\phi_i$ (e.g. periodic waveform A 332) by $T_{clk}/12$ (or about 1600 MHz). The output of the ΔΣM 206 may determine the desired current clock period. By adding the current clock period to the previous clock phase or period, the current clock phase could be deduced. As an example, assuming the previous clock phase is A 332 and the output of the ΔΣM 206 is zero, the clock period is ($T_{clk}$+0×$T_{clk}$/12) and therefore the current clock phase remains as A 332. Where the output of the ΔΣM 206 is −1, the clock period is ($T_{clk}$−1×$T_{clk}$/12), and therefore the current clock phase is L (=A+11×$T_{clk}$/12) 336. The ΔΣM 206 may have a 2-bit output (e.g. −2, −1, 0 and 1), which corresponds respectively to clock periods of 10$T_{clk}$/12, 11$T_{clk}$/12, 12$T_{clk}$/12 and 13$T_{clk}$/12. In this implementation, the ΔΣM 206 may have an average output of between −1 and 0.

As a non-limiting example, as shown in FIG. 3A, if the 1st chosen clock phase or clock signal is A 332, the next phase may be the clock phase or signal L 336 and every subsequent 11th clock phase may then be selected, i.e. A 332, L 336, K, J, I, H, G, F, E, D, C, B, and back to A 332 and so on. Therefore, the waveform may have an overall clock period of 11/12$T_{clk}$. FIG. 3A also shows a merged waveform 338 of the waveforms A 332 and L 336, where the waveform 338 has a clock period of 11/12$T_{clk}$. In various embodiments, every successive 10th, 11th, 12th or 13th chosen clock phase may correspond to a clock signal having a corresponding period of 10/12$T_{clk}$, 11/12$T_{clk}$, $T_{clk}$ or 13/12$T_{clk}$ respectively.

For a given input control word, K, the ΔΣ modulator controlled frequency interpolator 208 may select any of the 10th, 11th, 12th or 13th successive phases randomly to generate an average clock period. Each control word, K, results in a unique average clock period or frequency. The two frequency tones used in binary FSK transmission may hence be generated using two different control words, e.g. K0 and K1, to represent the '0' and '1' data.

Figure 3B:
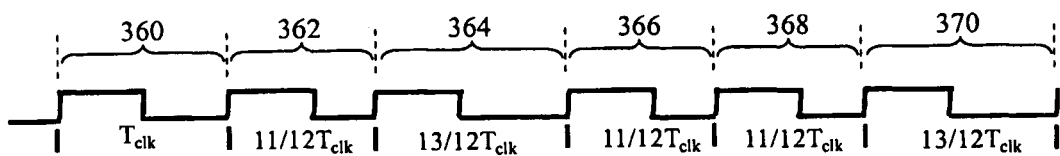

FIG. 3B shows the operation of a frequency interpolator, according to various embodiments, as a further non-limiting example. FIG. 3B shows an output signal or waveform, $\phi_{inj}$, based on the sequence of the selected clock phases or periodic waveforms A 332, L 336, A 332, L 336, K, L 336 of FIG. 3A, having an average clock period (or frequency) after 6 clock cycles of about 0.986$T_{clk}$ (average $T_{clk}$=($T_{clk}$ 360+11/12$T_{clk}$ 362+13/12$T_{clk}$ 364+11/12$T_{clk}$ 366+11/12$T_{clk}$ 368+13/12$T_{clk}$ 370)/6). Subsequently, the ILO 210 transmits the third harmonic of $\phi_{inj}$.

In various embodiments, the ΔΣM (e.g. 206) may be a digital element and may have a 2-bit output, which may be designed to pick every subsequent 10th to 13th clock phases, such that the input control word, K, for the ΔΣM may result in a dithered sequence that results in an average phase selection that is an interpolation between the 11th and 12th successive phase.

Figure 3C:
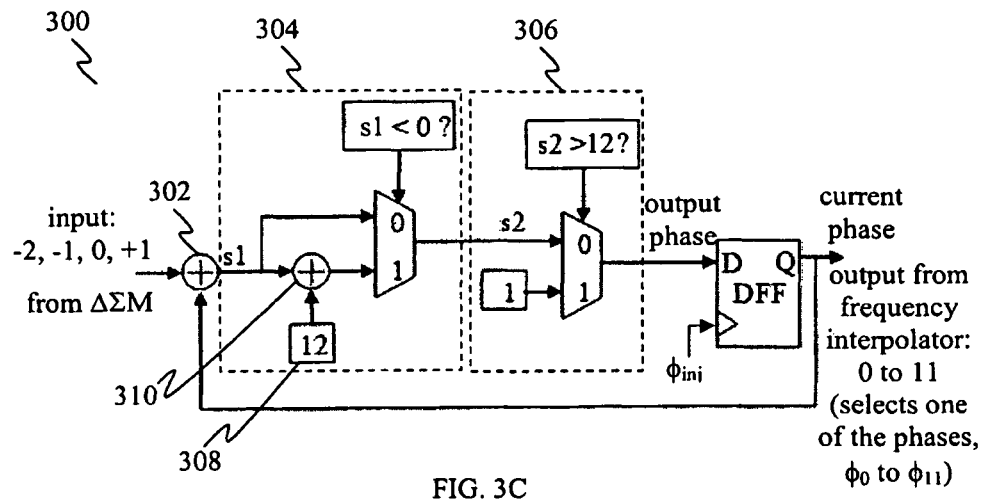
FIG. 3C shows a schematic of a frequency interpolator, according to various embodiments.

FIG. 3C shows a schematic 300 of a frequency interpolator (e.g. 208, FIG. 2), illustrating a wrap around adder such that its output selects only one of the phases, $\phi_0$ to $\phi_{11}$, during each sampling cycle. The schematic 300 illustrates the algorithmic implementation of the frequency interpolator, as shown below:

```
output phase = input + current phase
    if (output phase < 0)
        output phase = output phase + 12
    else
        if (output phase > 12)
            output phase = 1
        endif
    endif.
```

The adder or mixer 302 represents the operation "output phase=input+current phase", the dotted box 304 represents the operation for the condition "if (output phase<0); output phase=output phase+12" and the dotted box 306 represents the operation for the condition "if (output phase>12); output phase=1". A "Modulo 12 operation", as represented by the block 308 is employed at the adder 310, after the adder 302 to ensure only these 12 phases, $\phi_0$ to $\phi_{11}$, may be selected at any time. Therefore, the frequency interpolator includes logic gates having a programmable interconnection.

The digital ΔΣM (e.g. 206) may be a 2nd order modulator with dithering. The ΔΣM may have an input range of 21-bits, with an internal bus width of 28-bits to account for logic or arithmetic overflow. A pseudo random sequence of 23-bits may also be applied at the input of the quantizer of the ΔΣM (e.g. 206) for dithering. The output frequency of the frequency interpolator, $F_{inj}$, corresponding to $\phi_{inj}$, may be given by $$F_{inj} = \frac{1}{T_{clk} - \left(\frac{K}{2^m} \times \frac{T_{clk}}{12}\right)} \text{ for } 0 \leq K \leq 2^m, \quad \text{(Equation 1)}$$

where K and m are the input control word and the input bit resolution of the delta-sigma modulator (ΔΣM) respectively.

Therefore, each frequency step, $\Delta f_{inj}$, may be given by $$\Delta f_{inj} = (F_{inj})_{K+1} - (F_{inj})_K = \quad \text{(Equation 2)}$$
$$\frac{12 \cdot 2^m}{T_{clk}} \left\{ \frac{1}{[12 \cdot 2^m - (K+1)](12 \cdot 2^m - K)} \right\},$$

where $(F_{inj})_{K+1}$ and $(F_{inj})_K$ represent respectively the generated frequencies corresponding to the respective control words, (K+1) and K.

As $12 \cdot 2^m$ (which may also be represented as $12 \times 2^m$) is more than ten times of K, equation (2) may be approximated to $$\Delta f_{inj} \approx \frac{1}{12 \cdot 2^m T_{clk}}, \quad \text{(Equation 3)}$$

or close to the theoretical linear step of $$\frac{1}{11 \cdot 2^m T_{clk}}.$$

Therefore, the relationship may be approximated to be close to linear. As $\phi_{inj}$ is sub-harmonically injected into the ILO (e.g. 210), the output frequency step may have approximately a resolution of 3 times of $\Delta f_{inj}$. Due to the digital controllability and high resolution, the FSK transmitter 200 of various embodiments may be highly reconfigurable in terms of modulation index, frequency channel spacing, data rate, amongst others.

The FSK transmitter 200 employs frequency interpolation, where the architecture of the FSK transmitter 200 simplifies clock phase generation and does not include any scheme where the frequency of the signal is multiplied upwards and divided down, making it more efficient.

Moreover, the design of a multiply-up circuit (e.g. the frequency multiplier circuit or the edge combiner (EC) (e.g. 220)) for the frequency shift keying transmitter 200 may be less complicated as it contains AND-OR combinational logic, in contrast to complex flip-flop networks of a frequency divider, thereby making the FSK transmitter 200 less power consuming compared to the fractional-N PLL based transmitter [M. Perrott, T et al., "*A 27-mW CMOS fractional-N synthesizer using digital compensation for 2.5-Mb/s GFSK modulation,*" IEEE J. Solid-State Circuits, vol. 32, pp. 2048-2060, December 1997] and the delta-sigma modulator ($\Delta\Sigma M$) phase interpolator based transmitter [Y.-H. Liu and T.-H. Lin, "*A wideband PLL-based G/FSK transmitter in 0.18 μm CMOS,*" IEEE J. of Solid-State Circuits, vol. 44, no. 9, pp. 2452-2462, September 2009].

While the delta-sigma modulator ($\Delta\Sigma M$) phase interpolator based transmitter [Y.-H. Liu and T.-H. Lin, "*A wideband PLL-based G/FSK transmitter in 0.18 μm CMOS,*" IEEE J. of Solid-State Circuits, vol. 44, no. 9, pp. 2452-2462, September 2009] employs $\Delta\Sigma$ phase interpolation, the need of a high frequency PLL and phase switching at high output frequency make it energy inefficient. In contrast, the FSK transmitter 200 of various embodiments employs phase/clock phase generation using a DLL, and clock period interpolation. Furthermore, a DLL based architecture as in the FSK transmitter 200 is more energy efficient in generating multiple taps than a PLL since a higher frequency reference is not needed. The FSK transmitter 200 employs the $\Delta\Sigma M$ 206 to improve the frequency resolution. In addition, the quantization error of the FSK transmitter 200 may be made smaller, as compared to the delta-sigma modulator ($\Delta\Sigma M$) phase interpolator based transmitter where a higher $\Delta\Sigma M$ sampling frequency is used to reduce the quantization noise due to the limited number of phases, by increasing the number of delay taps or cells in the DLL 202 without employing a higher sampling frequency. Furthermore, in various embodiments, the average frequency is injection locked prior to transmission, therefore allowing low frequency operation.

Furthermore, the FSK transmitter 200 may not suffer from the shortcomings of the open-loop VCO/DCO based transmitter [J. L. Bohorquez, et al., "*A 350 μW CMOS MSK transmitter and 400 μW OOK super-regenerative receiver for medical implant communications,*" IEEE J. of Solid-State Circuits, vol. 44, no. 4, pp. 1248-1259, April 2009; J. Bae, et al., "*A 490 μW fully MICS compatible FSK transceiver for implantable devices,*" IEEE Proc. of Symp. on VLSI Circuits, pp. 36-37, June 2009], for example being susceptible to frequency drifting and poorer phase noise, and which additional frequency correction loop at the baseband or receiver side is needed to improve the performance. The FSK transmitter 200 includes a sub-harmonic injection locking mechanism, which ensures both accurate frequency locking and good phase noise without the complexity of PLL. The FSK transmitter 200 also offers stability as an injection locked output is more stable than the output from a free running oscillator since injection-locking behaves like a simple closed loop phase-locked loop (PLL). The FSK transmitter 200 achieves frequency switching through frequency interpolation.

The FSK transmitter 200 also offers frequency flexibility through the use of $\Delta\Sigma M$ 206 for frequency modulation. Furthermore, frequency tuning through the $\Delta\Sigma M$ 206 is more area efficient than frequency tuning through sub-ranging capacitor banks in the open-loop VCO/DCO based transmitter.

The FSK transmitter 200 offers frequency selection and a high data rate of at least 1 Mbps, while the overall power consumed may be about 3 mW. This architecture of the FSK transmitter 200 is generally digital in nature with the bulk of the power going to the $\Delta\Sigma M$ 206 and the frequency interpolator 208. By using a more advanced technology node, the power used by the $\Delta\Sigma M$ 206 and the frequency interpolator 208 may be reduced due to smaller capacitive output loads and a lower supply voltage. The DLL 202, the ILO 210 and the crystal oscillator 218 constitute the analog blocks of the architecture of the FSK transmitter 200, which typically consume less than 1 mW altogether.

The FSK transmitter 200 uses a delay-locked loop (DLL) (e.g. 202), as DLL does not have accumulated jitter and is inherently stable, making it easy to implement, as compared to a phase-locked loop (PLL) as used in the fractional-N PLL based transmitter [M. Perrott, T et al., "*A 27-mW CMOS fractional-N synthesizer using digital compensation for 2.5-Mb/s GFSK modulation,*" IEEE J. Solid-State Circuits, vol. 32, pp. 2048-2060, December 1997].

Moreover, the EC (or frequency multipliers) 220 are easier to design as compared to dividers, for speed and power optimizations due to its logic simplicity over dividers.

The FSK transmitter 200 of various embodiments achieve frequency agility through the use of the SEM 206, as compared to the injection locking with hybrid EC/PA based transmitter [J. Pandey and B. Otis, "*A 90 μW MICS/ISM band transmitter with 22%global efficiency,*" IEEE Proc. of Radio Frequency Integrated Circuits (RFIC) Symp., May 2010, pp. 285-288] which does not have frequency tunability, where there is only a single channel with a fixed deviation, thereby preventing multi-channel operations and rendering the transmitter more susceptible to interference. The AIM 206 in the FSK transmitter 200 of various embodiments allows fine frequency tuning and multi-channel operation and helps circumvent interference issues. In addition, the FSK transmitter 200 of various embodiments employs frequency interpolation, thereby achieving frequency tunability. The FSK transmitter 200 of various embodiments also employs DLL based clock generation.

Design considerations for low power and delay mismatch will now be described.

While the power consumed by the digital blocks (e.g. the $\Delta\Sigma M$ 206 and the frequency interpolator 208) may be constrained by the technology used, the architecture of each analog block (e.g. the DLL 202, the ILO 210 and the crystal oscillator 218) may be chosen or designed for low power consumption minimize power consumption.

Figure 4:
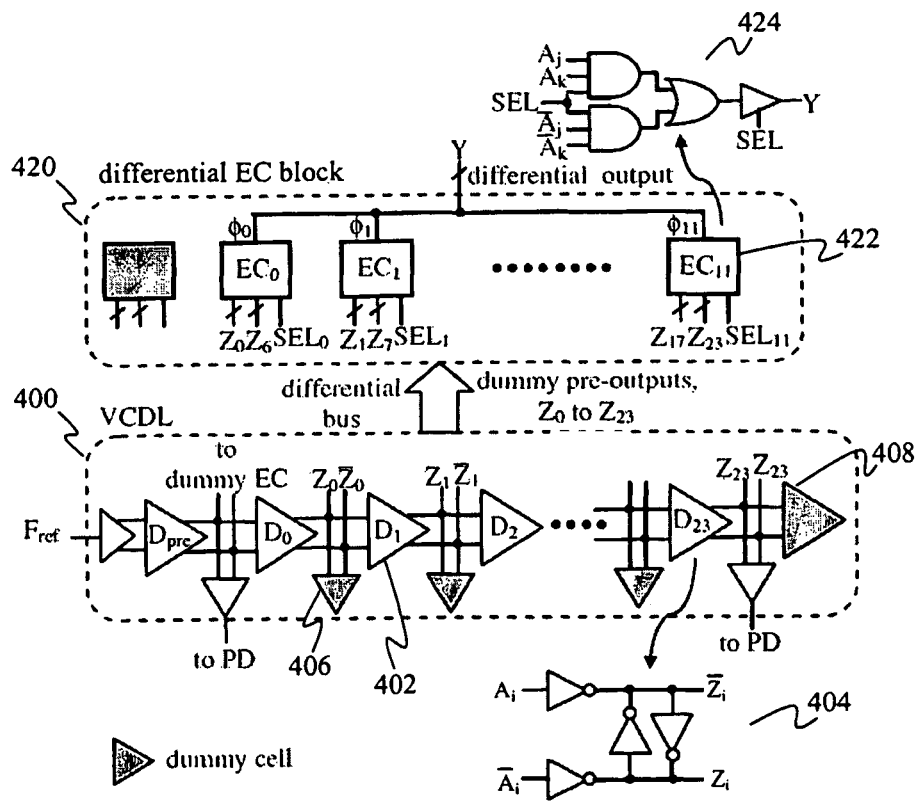
FIG. 4 shows a schematic of a delay line (VCDL) and an edge combiner (EC) block for a matching design, according to various embodiments.

In order to minimize power consumption, static CMOS logic may be employed to minimise or eliminate static currents. For example, in the delay line of the DLL 202, current starved inverters may be employed. While differential delay cells may be employed for better noise rejection compared to the single ended counterparts, they consume more power. Therefore, in order to have better supply noise rejection, a pseudo-differential type of delay cell (e.g. 402) architecture using pseudo differential current-starved inverters 404 as shown in FIG. 4 may be adopted for the delay line (VCDL) 400, consuming about 399 μA at about 1.2 V. The differential architecture is adopted for better supply noise immunity. Mismatch for each delay cell 402 has to be taken care of since large mismatches in delay may result in unwanted frequency spurs in the vicinity of the operating frequency. It should be appreciated that any number of delay cells 402 may be provided.

Hence, design effort in the layout of the delay line 400 to ensure that the delay cells 402 see the same amount of loading on each output is required. Dummy differential-to-single ended buffers (e.g. 406), for example, are used to load each delay cell 402 equally, whose output is not tapped for phase comparison at the phase detector (PD) (not shown), and an additional dummy delay cell 408 may be used to terminate the delay line 400 to ensure equal loading.

The VCDL 400 is coupled to a differential EC block 420 where each EC cell (e.g. 422) may be an arrangement 424 of logic gates (e.g. including AND gates, OR gates). It should be appreciated that any number of EC cells 422 may be provided, which may depend on the number of the delay cells 402 employed in the VCDL 400.

At the EC 420, as only a single clock phase is selected during each clock cycle, the select signal (e.g. $SEL_0$, $SEL_1$, ..., $SEL_{11}$) may be used to turn the AND-OR blocks of each arrangement 424 ON/OFF, for example to enable the AND-OR blocks of the chosen clock phase and disable the AND-OR blocks of unselected clock phases or signals to be inactive to minimize dynamic switching power and conserve power.

In operation, the total delay of the VCDL 400 is locked to (one) clock period of the reference clock, $\phi_{ref}$ (or equivalently to the frequency $F_{ref}$) and the 24 output taps or clock phases of the VCDL 400 are evenly or equally spaced apart by $T_{clk}/24$, where $T_{clk}=1/(133.33 \text{ MHz})$. The edge combiner (EC) 420 takes the 24 equally spaced clock phases from the VCDL 400 and combines the clock phases to form 12 evenly spaced clock signals or phases, where each of the 12 clock phases from the EC 420 has double the frequency of each of the 24 clock phases from the VCDL 400.

In addition, the ILO (e.g. 210) may include differential injection pair transistors, which may consume about 100 μA due to the usage of off-chip, high Q-factor PCB antenna (e.g. 212) as its inductive load. Furthermore, a capacitor bank may be provided, for example as part of the ILO (e.g. 210), to digitally tune the free running frequency to the required band since a small locking range is expected.

Figure 5:
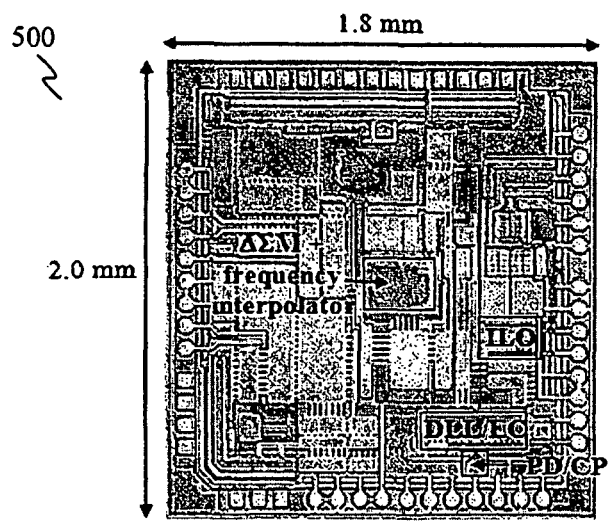
FIG. 5 shows a die photograph of a frequency shift keying transmitter, according to various embodiments.

FIG. 5 shows a die photograph 500 of a frequency shift keying transmitter, according to various embodiments. The die has dimensions of approximately 1.8 mm×2.0 mm, where the large area is attributed to the testing requirements and usage of bond pads. The active die area of all the blocks may occupy approximately 0.2 mm².

The measured results for the FSK transmitter of various embodiments will now be described.

Figure 6A:
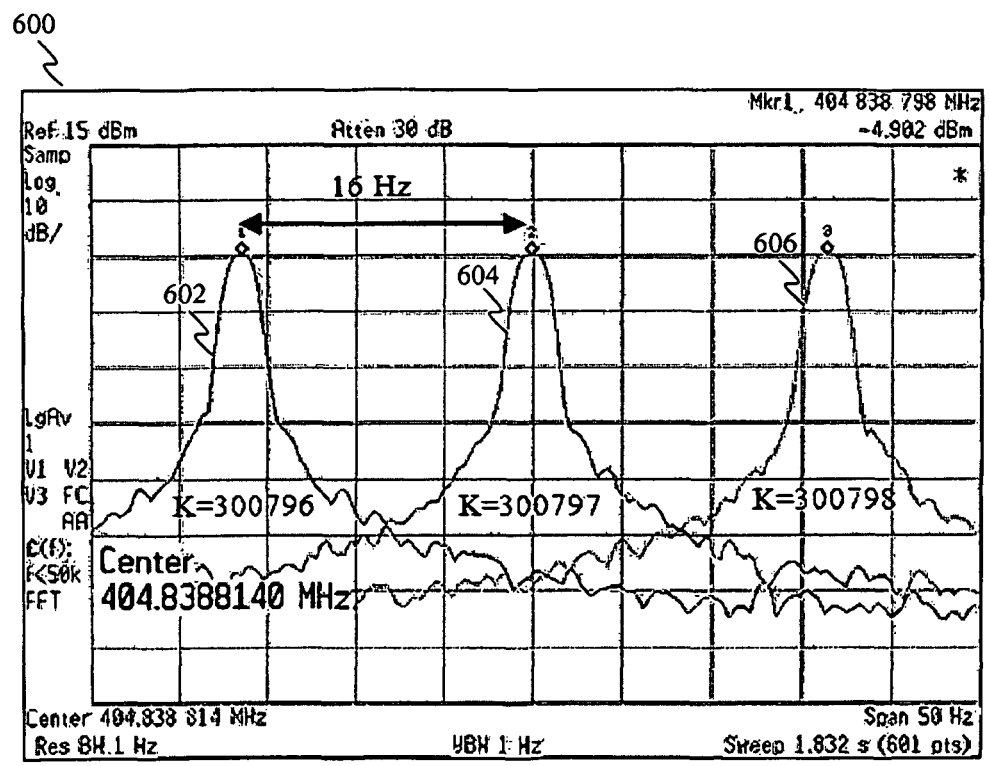
FIG. 6A shows a plot illustrating three frequency tones after injection locking at the injection lock oscillator (ILO) using different control words, according to various embodiments.

FIG. 6A shows a plot 600 illustrating three frequency tones after injection locking at the ILO using different control words, according to various embodiments. The plot 600 shows the output spectrum 602 at the ILO for the control word, K=300796, the output spectrum 604 for the control word, K=300797 and the output spectrum 606 for the control word, K=300798. The output spectra 602, 604, 606 show that every increment in the control word, K, causes a step increase of about 16 Hz in the output frequency. The results match closely to the expected output frequency based on equation (1).

Figure 6B:
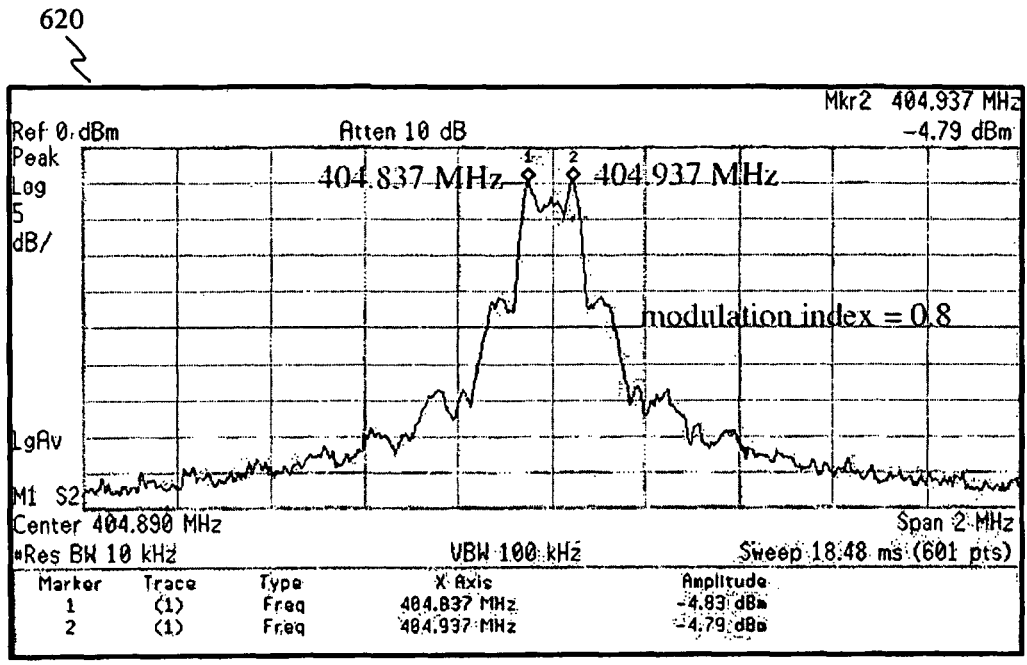
FIG. 6B shows a plot illustrating a frequency modulated output spectrum of two frequency tones spaced apart by about 100 kHz at a data rate of about 125 kbps at the injection lock oscillator (ILO), according to various embodiments.

FIG. 6B shows a plot 620 illustrating a frequency modulated output spectrum of two frequency tones spaced apart by about 100 kHz at a data rate of about 125 kbps at the ILO, according to various embodiments. The control words used are K=300682 and K=306822. A randomized data stream is employed, switching at a data rate of about 125 kbps. The frequencies are about 100 kHz apart, resulting in a modulation index of 0.8. The highest measured data rate is about 1 Mbps. A modulation index of 1 may be needed to clearly distinguish the 2 tones in the modulated spectrum.

Figure 6C:
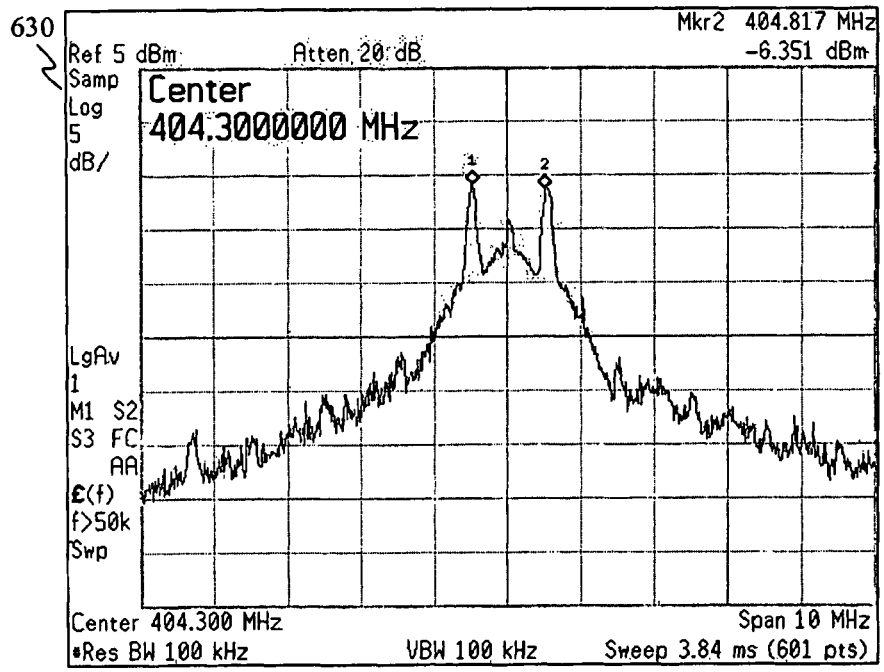
FIG. 6C shows a plot illustrating a frequency modulated output spectrum of two frequency tones spaced apart by about 1 MHz at a data rate of about 1 Mbps at the injection lock oscillator (ILO), according to various embodiments.

FIG. 6C shows a plot 630 illustrating a frequency modulated output spectrum of two frequency tones spaced apart by about 1 MHz at a data rate of about 1 Mbps at the ILO, according to various embodiments. The control words used are K=236825 and K=300797. A randomized data stream is employed, switching at a data rate of 1 Mbps. As shown in FIG. 6C, the two frequency tones may be distinguished. The phase noise at different frequencies range from about −92 dBc/Hz to about −104 dBc/Hz.

A tuning resolution of about 100 kHz may be achievable as the actual attained resolution is much smaller. The frequency resolution may be limited by the resolution of the delta-sigma modulator (ΔΣM).

In various embodiments, the power consumption at a data rate of about 1 Mbps is about 3 mW. The power level may be reduced by using a more advanced technology node and reducing the resolution of the delta-sigma modulator (ΔΣM) to a level sufficient to meet the required resolution. The major portion of the power is consumed by the digital logic or portion of the FSK transmitter of various embodiments due to the high sampling frequency of about 133.3 MHz, which may be needed to obtain an accurate average output frequency. However, the averaging number of 133 employed may be too high and therefore may be lowered to reduce the sampling frequency and switching power. In addition, the 21-bit delta-sigma modulator (ΔΣM) resolution may also be further reduced at the expense of a poorer frequency resolution, where a higher resolution allows for tuning potential. This may reduce the digital logics and reduce the switching power. Moreover, if a high data rate is not required, the AIM clock rate may be reduced. This may decrease the power consumed, because the AIM and the interpolator constitute a substantial part of power consumption.

Figure 7:
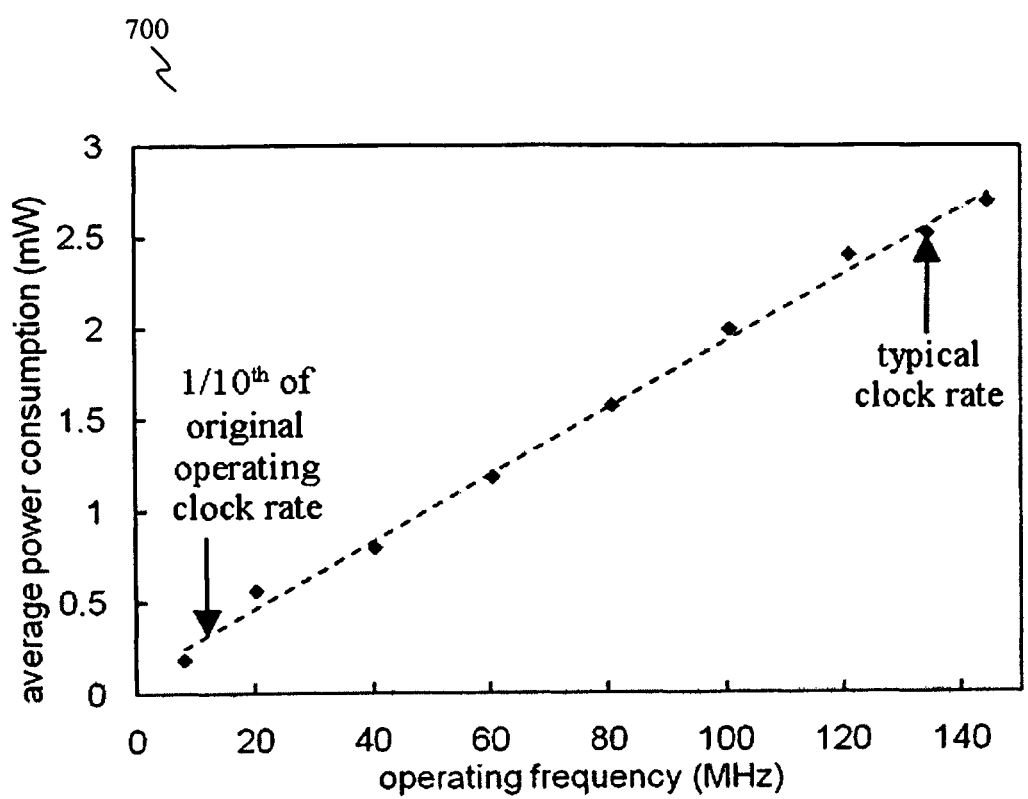
FIG. 7 shows a plot of measured power for the digital portion of the FSK transmitter of various embodiments at various sampling frequencies.

FIG. 7 shows a plot 700 of measured power for the digital portion of the FSK transmitter of various embodiments at various sampling frequencies. As shown in the plot 700, the relationship between the measured power (power consumption) and the sampling frequency (operating frequency) is almost or approaching a linear relationship.

As a lower sampling frequency may be used for a lower data rate while maintaining the same average number per transmitted data, the transmitter power may also scale down linearly. For a data rate of about 100 kbps, the sampling frequency may be reduced by about 10 times compared to that for a 1 Mbps transmission. Inferring from FIG. 7, the digital power consumption may be less than about 0.3 mW, which may give rise to a total transmitter power of about 0.8 mW. Hence, the FSK transmitter of various embodiments may also lead to efficient power usage according to data rates.

The performance of the FSK transmitter of various embodiments is summarised in Table 1. The FSK transmitter of various embodiments offers multi-channel capability with a frequency resolution of about 0.016 kHz and a smaller active area.

TABLE 1

| Parameter | FSK transmitter |
| --- | --- |
| Frequency range (MHz) | 400-436 (multi-channel) |
| Minimum resolution (kHz) | 0.016 |

TABLE 1-continued

| Parameter | FSK transmitter |
| --- | --- |
| Voltage (V) | 1.2 |
| Current (mA) | analog: 0.46 |
| | digital: 2.08 |
| TX power (dBm) | -5 |
| Datarate (kbps) | 1000 |
| Modulation | Frequency shift keying (FSK) |
| Modulation technique | ΔΣ clock period interpolator |
| Phase noise (dBc/Hz @ offset) | -95 @ 1 MHz |
| Active area (mm$^2$) | 0.2 |
| Technology | 0.18 μm CMOS | where "analog" and "digital" refer respectively to the analog and digital portions of the FSK transmitter of various embodiments.

In various embodiments, it should be appreciated that power consumption may be dependent on the technology node which the FSK transmitter of various embodiments is implemented. Using 0.18 μm CMOS technology, the power consumption may be dominated by the digital portion (approximately 80%). By migrating the design of the FSK transmitter of various embodiments to a more advanced technology (e.g. 0.13 μm CMOS technology), while the power consumed by the analog portion of the FSK transmitter of various embodiments may remain substantially the same, the power consumed by the digital portion of the FSK transmitter of various embodiments may be reduced substantially, such that a sub-mW FSK transmitter may be provided.

The FSK transmitter of various embodiments is a delay-locked loop (DLL) based architecture, suitable for low power applications. The transmitter incorporates a digital delta-sigma modulator (ΔΣM) and a ΔΣM based frequency interpolator to interpolate clock phases to generate different output frequencies, to achieve frequency tunability or selection. With the frequency interpolation, frequency channelization with relatively equal spacing may be achieved. The transmitter also uses average frequencies for sub-harmonic injection locking, thereby providing good frequency stability and power efficiency. A combination of injection locking and edge combining enables multiplication of the output frequency to the desired range, enabling power efficiency while sustaining good performance.

Various embodiments may provide a high resolution 400 MHz to 436.4 MHz FSK transmitter suitable for narrowband applications, such as battery-less remote control applications, implemented using the 0.18-μm CMOS process. The FSK transmitter employs frequency interpolator with a delta-sigma modulator (ΔΣM), coupled with sub-harmonic injection to keep the frequency generation circuit in the low frequency domain, to achieve FSK modulation. The transmitter may consume about 3 mW at about 1.2 V, while transmitting at a data rate of about 1 Mbps. The FSK transmitter offers frequency stability, frequency tunability, reasonably high data rate, and high reconfigurability such as modulation index, data rate, channel spacing, power consumption, amongst others. In various embodiments, the modulation noise may be reduced by using more delay cells.

The FSK transmitter of various embodiments offers reasonably high data rate, application flexibility, coupled with easy-to-design, synthesizable blocks. The output frequency may be digitally controllable, making it easier to calibrate. With the design being predominantly digital in nature, power consumption may be reduced using a more advanced deep-submicron CMOS technology. The transmitter of various embodiments also offers portability, robustness, and being less susceptible to process-voltage-temperature (PVT) variations as compared to the delta-sigma modulator (ΔΣM) phase interpolator based transmitter [Y.-H. Liu and T.-H. Lin, "*A wideband PLL-based G/FSK transmitter in* 0.18 μm *CMOS*," IEEE J. of Solid-State Circuits, vol. 44, no. 9, pp. 2452-2462, September 2009].

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A frequency shift keying transmitter comprising:
a logic gate arrangement that produces an output signal having a frequency that depends on input signals to the logic gate arrangement;
a clock generator coupled to the logic gate arrangement, the clock generator adapted to produce a clock signal; and
a sampling arrangement coupled to the logic gate arrangement, the sampling arrangement adapted to receive a data signal, wherein the sampling arrangement is configured to sample the clock signal to generate periodic waveforms delayed from each other by an interval determined by the point the clock signal is sampled, wherein the sampling arrangement is configured to be controlled by the data signal to have the logic gate arrangement select periodic waveforms that are delayed from each other by one of a set of intervals associated with the data signal, to be used as the input signals to the logic gate arrangement to produce the output signal, wherein the selected periodic waveforms are merged to produce the output signal, wherein the sampling arrangement comprises a delta-sigma modulator coupled to a frequency interpolator, the delta-sigma modulator configured to receive the data signal and providing sampling data to the frequency interpolator, the frequency interpolator configured to produce the input signal by $$F_{inf} = \frac{1}{T_{clk} - \left(\frac{K}{2^m} \times \frac{T_{clk}}{12}\right)} \text{ for } 0 \leq K \leq 2^m$$

where K and m are the input control word and the input bit resolution of the delta-sigma modulator respectively, and Tclk is an average clock period related to the input control word K;
and wherein the output signal is a frequency shift keying signal.

2. The frequency shift keying transmitter of claim 1, wherein the clock signal comprises equally spaced apart clock edges.

3. The frequency shift keying transmitter of claim 2, wherein each of the clock edges has a frequency of around 1600 MHz.

4. The frequency shift keying transmitter of claim 2, wherein each of the periodic waveforms has a period equal to 12 of the clock edges.

5. The frequency shift keying transmitter of claim 1, wherein the logic gate arrangement randomly selects the periodic waveforms.

6. The frequency shift keying transmitter of claim 1, wherein the interval between periodic waveforms that are successively selected is any one of an interval of 10, 11, 12 or 13 of the clock edges.

7. The frequency shift keying transmitter of claim 1, wherein the output signal has an average frequency of the selected periodic waveforms.

8. The frequency shift keying transmitter of claim 1, wherein the delay between two successively generated periodic waveforms is 1/12th of the period of the periodic waveforms.

9. The frequency shift keying transmitter of claim 1, wherein the logic gate arrangement comprises logic gates having a programmable interconnection, the programmable interconnection configured to connect the logic gates that are used to process two selected periodic waveforms to produce the output signal.

10. The frequency shift keying transmitter of claim 1, wherein the data signal comprises at least two different words, each word representative of binary data to be transmitted.

11. The frequency shift keying transmitter of claim 1, wherein the clock generator comprises clock edge combiner circuitry.

12. The frequency shift keying transmitter of claim 11, wherein the clock generator comprises delay circuitry coupled to the clock edge combiner circuitry.

13. The frequency shift keying transmitter of claim 1, further comprising a transmission stage coupled to the logic gate arrangement to receive the output signal from the logic gate arrangement for transmission.

14. The frequency shift keying transmitter of claim 13, wherein the transmission stage comprises an oscillator to receive the output signal from the logic gate arrangement; and an inductive antenna coupled to the oscillator, wherein the inductive antenna transmits the output signal.

15. The frequency shift keying transmitter of claim 14, wherein the oscillator comprises circuitry that is configured to generate a transmission signal based on the third harmonic of the output signal from the logic gate arrangement.

16. A frequency shift keying receiver adapted to receive and extract the data signal from a frequency shift keying transmitter of claim 1.

17. A frequency shift keying transmitter comprising:
a logic gate arrangement that produces an output signal having a frequency that depends on input signals to the logic gate arrangement;
a clock generator coupled to the logic gate arrangement, the clock generator adapted to produce a clock signal; and
a sampling arrangement coupled to the logic gate arrangement, the sampling arrangement adapted to receive a data signal, wherein the sampling arrangement is configured to sample the clock signal to generate periodic waveforms delayed from each other by an interval determined by the point the clock signal is sampled, wherein the sampling arrangement is configured to be controlled by the data signal to have the logic gate arrangement select two of the periodic waveforms that are delayed from each other by a predefined interval associated with the data signal, to be used as the input signals to the logic gate arrangement to produce the output signal, wherein the selected periodic waveforms are merged to produce the output signal, wherein the sampling arrangement comprises a delta-sigma modulator coupled to a frequency interpolator, the delta-sigma modulator configured to receive the data signal and providing sampling data to the frequency interpolator, the frequency interpolator configured to produce the input signal by $$F_{inf} = \frac{1}{T_{clk} - \left(\frac{K}{2^m} \times \frac{T_{clk}}{12}\right)} \text{ for } 0 \le K \le 2^m$$

where K and m are the input control word and the input bit resolution of the delta-sigma modulator respectively, and Tclk is an average clock period related to the input control word K;
and wherein the output signal is a frequency shift keying signal.

18. A frequency shift keying transmitter comprising:
a logic gate arrangement that produces an output signal having a frequency that depends on input signals to the logic gate arrangement;
a clock generator coupled to the logic gate arrangement, the clock generator adapted to produce a clock signal; and
a sampling arrangement coupled to the logic gate arrangement and the clock generator, the sampling arrangement adapted to receive a data signal, wherein the sampling arrangement is configured to sample different intervals within the clock signal to cause the clock generator to generate periodic waveforms, which are offset from one another, wherein the data signal controls the sampling arrangement to select which two of the periodic waveforms, offset from each other by a predefined interval, are to be used as the input signals to the logic gate arrangement to produce the output signal, so that the frequency of the output signal depends on the data signal, wherein the selected periodic waveforms are merged to produce the output signal, wherein the sampling arrangement comprises a delta-sigma modulator coupled to a frequency interpolator, the delta-sigma modulator configured to receive the data signal and providing sampling data to the frequency interpolator, the frequency interpolator configured to produce the input signal by $$F_{inf} = \frac{1}{T_{clk} - \left(\frac{K}{2^m} \times \frac{T_{clk}}{12}\right)} \text{ for } 0 \le K \le 2^m$$

where K and m are the input control word and the input bit resolution of the delta-sigma modulator respectively, and Tclk is an average clock period related to the input control word K;
and wherein the output signal is a frequency shift keying signal.

* * * * *